(12) United States Patent
Bozionek et al.

(10) Patent No.: US 8,045,579 B2
(45) Date of Patent: Oct. 25, 2011

(54) METHOD FOR MANAGING COMMUNICATION CONNECTIONS BY NETWORK ADDRESS TRANSLATING (NAT) NETWORK NODES

(75) Inventors: Bruno Bozionek, Borchen (DE); Ernst Horvath, Vienna (AT); Karl Klaghofer, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 195 days.

(21) Appl. No.: 12/308,733

(22) PCT Filed: Jun. 29, 2007

(86) PCT No.: PCT/EP2007/056530
§ 371 (c)(1),
(2), (4) Date: Dec. 22, 2008

(87) PCT Pub. No.: WO2008/003644
PCT Pub. Date: Jan. 10, 2008

(65) Prior Publication Data
US 2010/0014522 A1      Jan. 21, 2010

(30) Foreign Application Priority Data
Jul. 3, 2006   (DE) .......................... 10 2006 030 591

(51) Int. Cl.
*H04J 3/16* (2006.01)
(52) U.S. Cl. ...................................................... 370/466
(58) Field of Classification Search .......... 370/351–356, 370/400–401, 465–466
See application file for complete search history.

(56) References Cited

U.S. PATENT DOCUMENTS

| 7,359,382 B2 * | 4/2008 | Liu et al. ........................ 370/392 |
| 7,543,064 B2 * | 6/2009 | Juncker et al. ................. 709/227 |
| 2005/0013301 A1 | 1/2005 | Bouchat et al. |
| 2006/0050700 A1 * | 3/2006 | Ravikumar et al. ........... 370/389 |
| 2006/0120293 A1 | 6/2006 | Wing |
| 2007/0019623 A1 * | 1/2007 | Alt et al. ........................ 370/352 |
| 2007/0076729 A1 * | 4/2007 | Takeda .......................... 370/401 |
| 2007/0217407 A1 * | 9/2007 | Yuan et al. .................... 370/389 |

FOREIGN PATENT DOCUMENTS

| CN | 1633100 A | 6/2005 |
| EP | 1693998 A1 | 8/2006 |
| WO | WO 2005062546 A1 | 7/2005 |

OTHER PUBLICATIONS

Rosenberg et al, STUN-Simple Traversal of User Datagram Protocol (UDP) Through Network Address Translators (NATs), RFC 3489, 47 pages, Mar. 2003.*

* cited by examiner

*Primary Examiner* — Frank Duong

(57) ABSTRACT

The invention relates to a method for managing communication connections in a communication system, comprising the following steps: generation of a connection request with a source network address internally valid in the communication system, over at least one network address translating network node to a network element outside the communication system, acceptance of a connection confirmation with a valid network address of a network element outside the communication system, providing the source network address internally valid in the communication system an the network address valid outside the communication system to a connection entry provided on the network element outside the communication system.

17 Claims, 3 Drawing Sheets

| 1 | 2 | 3 | 4 | 5 | 6 |
|---|---|---|---|---|---|
| 31488 | 139.103.144.77 | 212.117.99.33 | 81.723.148.124 | 210.88.18.6 | 168.101.77.04 |
| 4711 | 139.103.144.123 | 212.117.99.77 | ... | ... | ... |
| ... | ... | ... | ... | ... | ... |
| ... | ... | ... | ... | ... | ... |

METHOD FOR MANAGING COMMUNICATION CONNECTIONS BY NETWORK ADDRESS TRANSLATING (NAT) NETWORK NODES

CROSS REFERENCE TO RELATED APPLICATIONS

This application is the US National Stage of International Application No. PCT/EP2007/056530, filed Jun. 29, 2007 and claims the benefit thereof. The International Application claims the benefits of German application No. 10 2006 030 591.4 filed Jul. 3,

FIELD OF INVENTION

The invention relates to a method for managing communication connections in a communication system.

BACKGROUND OF THE INVENTION

Network address translating network nodes are known from the prior art, which are known in technical literature as NAT (Network Address Translation). With a network address translation, "local", in other words addresses valid only within a first local network area, are translated for a communication with network elements of an external second network area. The respective address of the sending network element and/or of the network element intended for receipt is used and/or replaced as a sender and/or destination address.

A method is also known, with the aid of which network elements within a network area can first determine whether the actual network area is delimited by a network address translating network node and with the aid of which a traversal of the actual network area is assisted. Such a method is also known as STUN (Simple Traversal of UDP over NATs).

One essential operation of the STUN protocol consists in a request of the actual public network address directed at the STUN server. In addition, a request for port numbers which were allocated for the request in network address translating network nodes is also possible. In this way STUN assists with an allocation of a network address which is valid for the transportation of the following messages e.g. IP address (Internet Protocol) and a port number.

The afore-described allocation is problematical in some instances, in which a communication terminal is connected to several external communication terminals. Such a constellation occurs for instance if a local network has a plurality of accesses to the worldwide data network by way of a so-called ISP (Internet Service Provider) and the communication terminal in this way has to use a plurality of public network addresses in order to communicate with a plurality of external communication terminals by way of the different network address translating network nodes.

SUMMARY OF INVENTION

The object of the invention is to provide means which allow communication connections to be managed by several participating network address translating network nodes.

The object underlying the invention is achieved by a method with the features of the claims.

In accordance with the invention, a method is proposed for managing communication connections in a communication system, which, in a first step, generates at least one connection request with a source network address valid inside the communication system over at least one network address translating network node (in particular NAT network node) to at least one network element outside the communication system.

In a further step, at least one connection confirmation with at least one valid source network address outside the communication system which can be assigned to the network element outside the communication system is accepted. In a last step, an allocation of the at least one source network address valid inside the communication system and the at least one source network address valid outside the communication system to a connection entry assigned to the network element outside the communication system takes place.

The allocation to a connection entry assigned to the network element outside the communication system particularly advantageously results in an entry which can be managed easily, with which an addressing of a network element outside the communication system, for instance a VoIP telephone (Voice over Internet Protocol) is enabled.

Advantageous developments and embodiments of the invention are the subject matter of the subclaims.

BRIEF DESCRIPTION OF THE DRAWINGS

One exemplary embodiment with an additional advantage and embodiments of the invention is described in more detail below with reference to the drawing, in which.

DETAILED DESCRIPTION OF INVENTION

Figure 1:
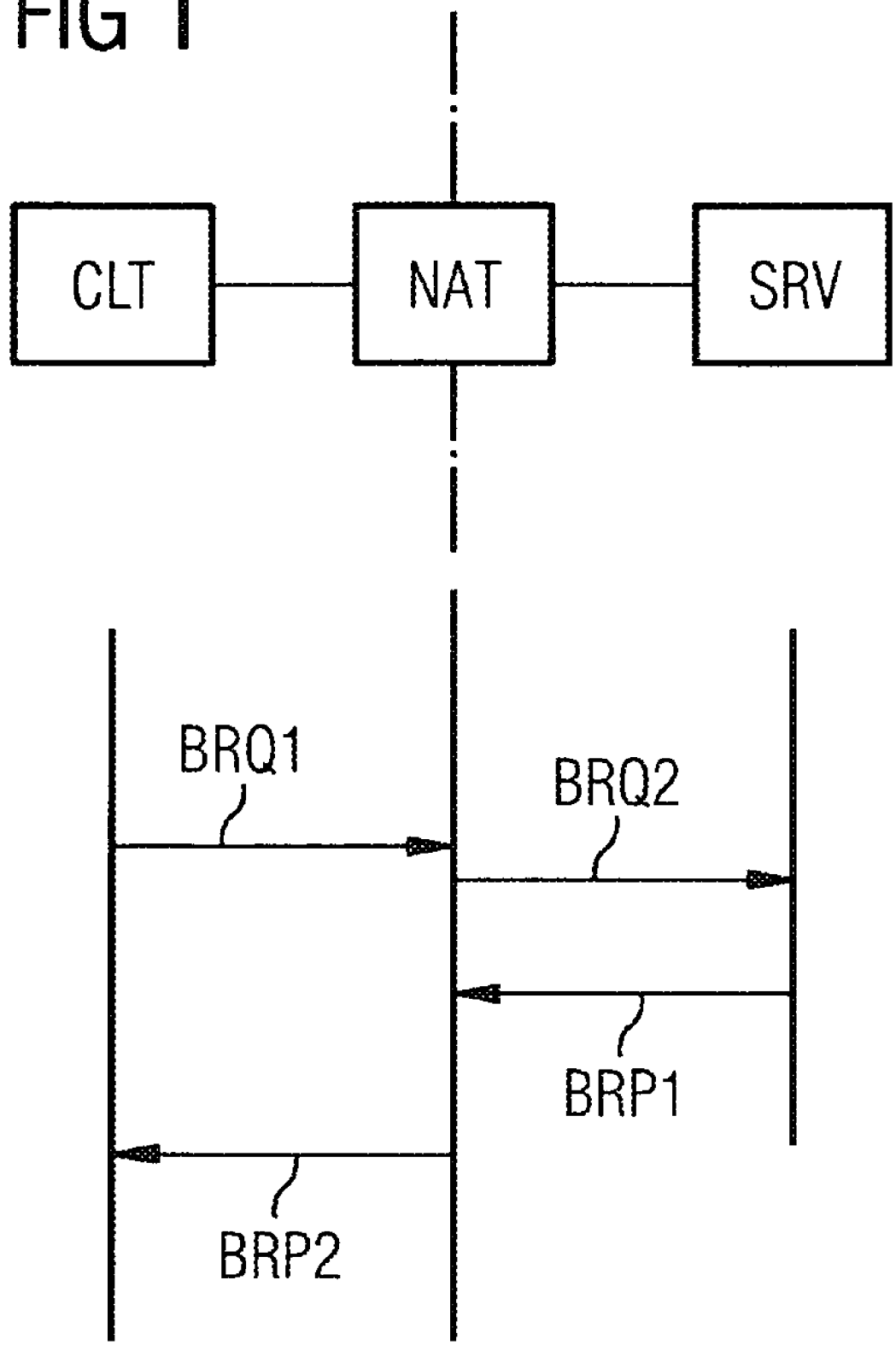
FIG. 1 shows a block diagram and a temporal message exchange diagram for the schematic illustration of a reference of an externally valid network address of a server.

The problem with network address translating network nodes as mentioned in the introduction is, firstly without reference to the drawing, explained below with reference to an application, which occurs in particular with a packet-oriented voice communication and/or VoIP (Voice over IP). This exemplary application is incidentally not to be understood as restrictive for the application of the invention. A participating network element is thus occasionally also referred to as a communication terminal or communication partner, without the invention being restricted to this embodiment of the network element.

For packet-oriented voice or video communication, general multimedia communication, the SIP protocol (Session Initiation Protocol) is frequently used. This is a protocol to set up a communication session between a plurality of communication terminals. The SIP is specified in the Document RFC 3261 (Request for Comment) of the IETF (Internet Engineering Task Force) and is used in order to determine the communication terminals participating in the communication in each instance and to set up the communication session.

The actual exchange of communication data takes place by way of the session description protocol (SDP) as well as the realtime transport protocol (RTP). The object of the SDP consists in negotiating codecs, transport protocols etc. to be used between the communication terminals. The RTP finally defines the exchange of actual communication data and/or payload between the communication terminals. The expression payload refers here to the data of a data packet, which generally does not contain any further control or protocol information which is necessary for the communication session.

If a packet-oriented voice communication takes place over a respective network area, i.e. by the participation of communication terminals which are provided beyond the local network area, the use of the SIP causes several problems which are summarized in brief below.

For the exchange of communication data between two terminals, the RTP application provides for a transportation of the data stream with the UDP protocol (User Datagram Protocol). UDP ports used for the transmission of communication data are allocated dynamically, which renders difficult the use below of SIP in conjunction with firewalls, NAT routers or NAT "boxes", network address translating network nodes, since the majority of network address translating network nodes can not assign the dynamically allocated UDP ports to the signaling connection.

To avoid this problem, the STUN protocol (Simple Traversal over UDP through NATs) is used for instance, which allows network address translating network nodes to be identified along the communication path to be set up and which can overcome the limits predetermined by the network address translating network nodes between the local network area and the communication terminal positioned beyond this local network area.

The corresponding method is explained on the basis of FIG. 1. FIG. 1 shows a network element CLT, which is connected to a server SRV by way of a network address translating network node NAT. The server SRV is, exclusively or inter alia, set up for the eradication of the STUN protocol on the server side and is also referred to below as STUN server. A message exchange which accompanies the STUN protocol includes for instance a first connection request BRQ1 which is based on the network element CLT, which terminates in the network node NAT and is sent to the server SRV in the form of a second connection request BRQ2. Correspondingly, the server SRV sends a first connection confirmation BRP1, which terminates at the network node NAT and is transmitted to the network element CLT in the form of a second connection confirmation BRP2. A "termination" of a message at a network element is understood here to mean that the corresponding message ends at the respective network element, in other words it is evaluated there and a "passed on" message from the respective network element is reassembled.

It is assumed below that the network element CLT has a locally valid source network address X and/or a locally valid port number x. The combination of source network address and port number of the network element CLT is used in the form of the notation X:x in a message header entry and/or header of the first connection request BRQ1.

The corresponding combination of the server SRV is entered as the target network address and/or target port number of the first connection request BRQ1, usually also referred to as a "destination", in the form of the notation P:p. The server provided as the target is thus characterized by the network address P and/or by the port number p.

The network node NAT receives the first connection request BRQ1 and performs a network address translation in respect of the source network address X and the source port x and forwards the connection request in the form of the second connection request BRQ2 over the limits of the local network to the server SRV.

The changed connection request message BRQ2 is characterized in that the original source network address X was replaced by a changed source network address A. The changed source network address A corresponds here to the network address of the network node. The same similarly applies to the port number, which was changed to a.

In the course of forwarding the connection request BRQ1, the network node NAT reserves a so-called "Pin Hole", with a connection with a reservation of the used network address and/or the used port being noted.

This connection ends in this case in a corresponding conventional listing (X,x)<--->(A, a). This connection leads to each incoming data packet with a target address A:a being transmitted to a network element CLT with the network address X:x and vice versa, and the sender address X:x being changed to A:a in an outgoing data packet. The temporal duration of such a connection is usually limited on the part of the network node NAT and can be renewed at periodic intervals if necessary.

The server SRV responds with a first connection confirmation message BRP1, which, in the aforesaid manner with a network address translation, is transmitted to the network element CLT in the form of a second connection confirmation BRP2.

If the network element CLT is used for a packet-oriented voice communication, a SIP application provided on the network element CLT for action can send an externally valid network address to a SIP proxy server (not shown).

A communication set up to a network element outside the local network area is described below with further reference to the functional units in FIG. 1.

Figure 2:
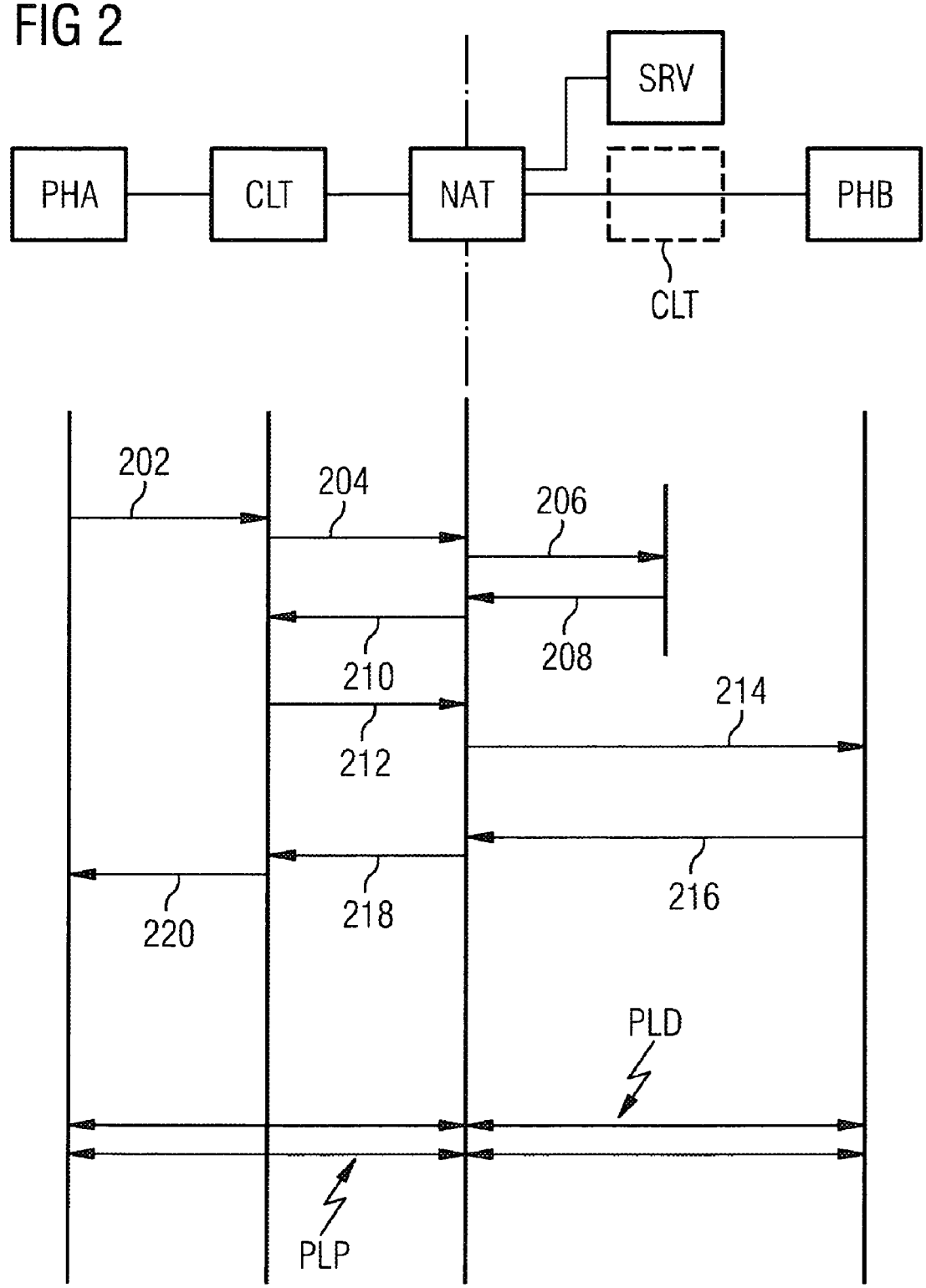
FIG. 2 shows a block diagram and a temporal message flow chart for the schematic illustration of a communication design.

FIG. 2 shows the network node known from FIG. 1 as well as the server SRV known from FIG. 1. In contrast to the exemplary embodiment according to FIG. 1, the network element CLT there does not communicate directly with the network node NAT. In the exemplary embodiment of the present FIG. 2, a first communication terminal PHA connected by way of a communication facility CLT is provided instead. The communication facility CLT has an identical reference character to the network element CLT known from FIG. 1 in order to express that the communication facility CLT adopts certain functions instead of the first communication terminal PHA, which, in the exemplary embodiment in FIG. 1, had to be implemented by the local network element CLT itself.

The first communication terminal PHA is any network element. To describe the invention on the basis of a communication environment, it is assumed below in a non-restrictive manner, that the first communication device PHA is embodied as a VoIP communication terminal. Correspondingly, the communication facility CLT is provided for a packet-oriented switching and management of a plurality of communication terminals communicating in a packet-oriented fashion (not shown). The communication facility CLT is usually connected to a plurality of network nodes, with, for overview purposes, only a first network node NAT being shown in the drawing. For overview purposes, further possible connections of the network node NAT, e.g. to an Internet Service Provider (ISP) and to further, network nodes (not shown) leading to other network areas (not shown), are not illustrated.

The network node NAT is connected to a STUN server SRV in the manner known from FIG. 1. The network node NAT is also connected to a second communication terminal PHB, for the technical embodiment of which the details relating to the first communication terminal PHA essentially apply. In particular, the second communication terminal PHB can similarly be connected to the network node NAT by way of a communication facility CLT. This is however irrelevant for the additional method description, as a result of which the communication facility CLT on the side of the second communication terminal PHB is shown in the drawing with a dashed line. The flow chart shown in the lower region of FIG. 2 thus does not relate to the communication facility CLT shown with a dashed line, but instead to the server SRV.

Reference is made below to the flow chart of exchanged messages in the lower half of FIG. 2.

In the course of a facility of a communication setup based on the first communication terminal PHA, an invitation message 202 "Invite" is sent from here to the communication facility CLT. The communication facility CLT now introduces a connection request in cooperation with the network node NAT, which is accompanied by the messages 204, 206, 208, 210, which are essentially identical to the connection request and/or connection confirmation messages BRQ1, BRQ2, BRP1, BRP2 known from FIG. 1.

After a connection has been established on the part of the network node NAT, the communication facility CLT sends a modified invitation message 212 to the network node NAT. The modified invitation message differs from the invitation message 202 sent by the first communication terminal PHA in that the "public" network addresses correspondingly defined by the connection in respect of the payload data connection are contained in the modified invitation message 202. The invitation message 212 received at the network node NAT is sent to the provided destination, namely the second communication terminal PHB in the form however of a modified invitation message 214, depending on the configuration of the conventional network address translation. A further characteristic of the communication setup essentially corresponds to the specifications of the SIP protocol, in the course of which additional messages (not shown) are optionally exchanged.

To confirm the availability of a connection setup by means of the second communication terminal PHB, a confirmation message 216 is sent herefrom, which, following a corresponding address translation by means of the network node NAT, is forwarded to the communication facility CLT in the form of a modified confirmation message 218 from the network node NAT. A confirmation message 220 is then conveyed by the communication facility CLT to the first communication terminal PHA, whereupon all prerequisites for the exchange of payload are now fulfilled in a communication session. The first communication terminal PHH now bidirectionally exchanges payload PLD with the second communication terminal PHB, which is shown graphically by several double arrows.

For simplification purposes, FIG. 2 only shows an external communication partner of the first communication device PHA in the fashion of the second communication terminal PHB. For a realistic case of a communication environment with more than one access to the worldwide data network and/or with several accesses to several SIP providers and/or by way of more than one network node NAT, a situation arises however whereby a communication terminal PHA and/or its managing communication facility CLT has to use more than one public network address, in order to communicate with several external communication terminals by way of the different network areas and/or different network nodes NAT.

The inventive STUN client management within the communication infrastructure formed essentially by the communication facility CLT now provides for the different public network addresses to be determined and stored in a respective connection entry. Such a determination does not occur, as was previously customary, in a situational manner, in other words ad hoc, but instead in advance and can be accessed in a simple fashion. The determination is potentially repeated here in periodic intervals in order to increase endangered connections before their expiry. In this way, each external communication terminal PHB immediately knows at the starting point of the communication process which external network address and/or which external port number for the internal communication terminal PHA of the respective network node NAT is communicated to the respective external communication terminal PHB.

Figures 3, 4:
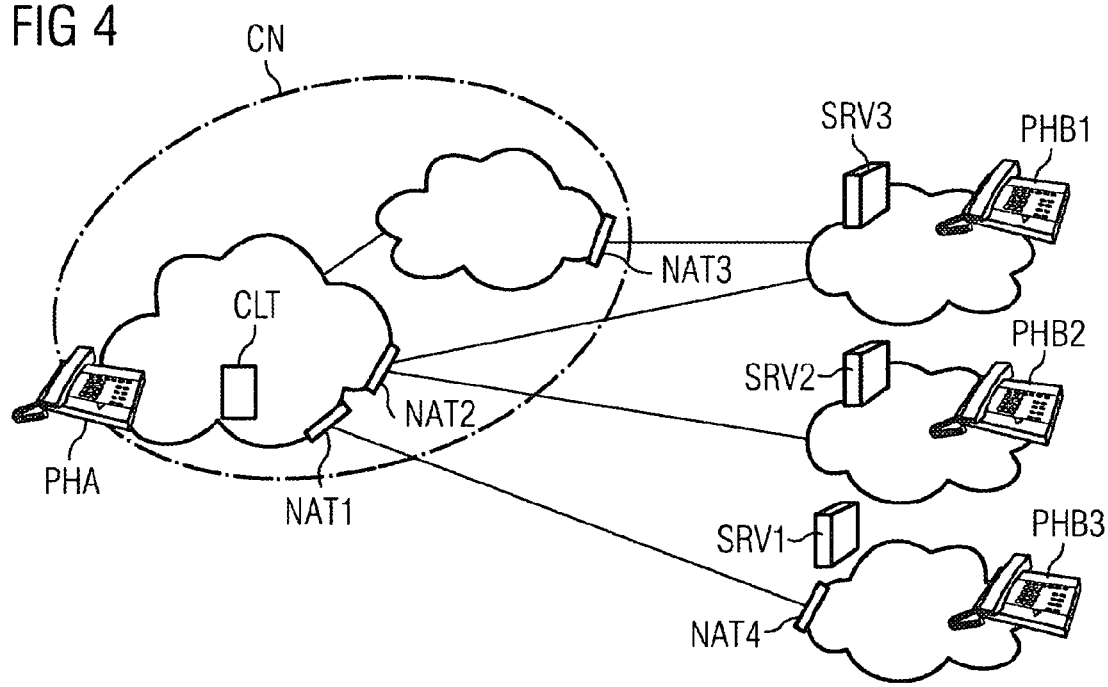
FIG. 3 shows a schematic illustration of a connection table with exemplary connection entries.
FIG. 4 shows a schematic illustration of a plurality of network segments, which are connected to one another by means of network address translating network elements.

FIG. 3 shows an assembly of several connection entries in a connection table. The first column 1 in the connection table has an identification of the network element outside the communication system. In the present exemplary embodiment, the network element and/or communication terminal outside the communication system is characterized by its call number. The call numbers 31488 and 4711 are shown by way of example in the first column 1 of the connection table.

In a second column 2, a network address and/or IP address valid inside the actual network area and/or inside the actual communication system is entered in a respective connection entry 31488, 4711.

An externally valid network address for a first network operator and/or ISP as well as an externally valid network address for a second network operator is entered accordingly in the third column 3 and the fourth column 4 respectively.

Additional network addresses, which address alternative network operators for instance, are then finally provided in the columns 5 and 6.

FIG. 4 shows a communication system CN consisting of a communication facility CLT, to which several communication terminals are connected. The drawing in turn only shows the first communication terminal PHA by way of example. In order to connect further communication systems (without reference characters and shown as "clouds"), which, in the linguistic usage of the previous embodiments, are to be referred to as outside the communication system, a first, a second and a third network address translating network nodes NAT1, NAT2, NAT3 are provided.

A connection by way of the third network node NAT3 is shown in the direction of a first communication partner PHB1 outside the communication system. One optional additional connection by way of an alternative ISP is shown by way of the second network node NAT2. A connection by way of the second network node NAT2 is shown in the direction of a second communication partner PHB2 outside the communication system. A connection by way of the first network node NAT as well as by way of a further network node NAT 4 on the side of the communication system of the communication partner PHB3 outside the communication system is shown in the direction of a third communication partner PHB3 outside of the communication system. Further servers SRV1, SRV2, SRV3 are assigned to the respective external communication systems.

The inventive means for managing communication connections now enable a selection of the direction of the communication setup toward the communication device outside the communication system to be determined in the form of a "call processing" and/or "feature processing" inside a communication facility. For a call setup based on the first communication terminal PHA using the SIP protocol to an external communication partner, e.g. of the communication partner PHB3 outside the communication system, a corresponding direction is selected on the basis of a performance feature and/or "feature" within the communication facility CLT, which is selected for this external communication partner by cooperating with the connection entries.

The inventive means thus result in an additional advantage such that this decision on the direction is also enabled for additional performance features such as Least Cost Routing, Call Admission Control, selection of a call direction by way of a characteristic number etc. The decision on the direction thus also determines a corresponding network node NAT1, NAT2, NAT3, by way of which the call is routed. A selection of the associated external network address takes place implicitly here. The inventive method for managing communication connections hereby adopts the corresponding selection for the communication subscriber to be called.

It shall be understood that other embodiments use alternative NAT techniques, without affecting the spirit of the inventive concept. This also includes alternative protocols to the said STUN. For instance, protocols such as Internet Connectivity Establishment (ICE) or Traversal Using Relay NAT (TURN) can also be used.

The invention claimed is:

1. A method for managing communication connections in a communication system, comprising:
a first communication terminal of a first communication network generating a first connection request directed to a first external communication terminal that is in an external communication network that is external to the first communication network of the first communication terminal, the first connection request having a source network identifier for the first communication terminal that is valid inside the first communication network;
translating the source network identifier of the first connection request by a first network address translating node to identify a network identifier for the first network address translating node;
transmitting a second connection request directed to the first external communication terminal, the second connection request having the translated source network identifier that was translated by the first network address translating node;
receiving a confirmation message from the first external communication terminal by the first network address translating node, the confirmation message comprising a network identifier for the first external communication terminal that is valid inside the external communication network;
providing the source network identifier of the first connection request and the network identifier of the first external communication terminal to a connection table for inclusion in a connection entry in the connection table; and
establishing a connection between the first communication terminal and the first external communication terminal such that payload is exchangeable between the first communication terminal and the first external communication terminal.

2. The method of claim 1 further comprising:
the first communication terminal of a first communication network generating a third connection request directed to a second external communication terminal that is in a second external communication network that is external to the first communication network of the first communication terminal, the third connection request having a second source network identifier for the first communication terminal that is valid inside the first communication network;
translating the second source network identifier of the first connection request by the first network address translating node to identify a network identifier for the first network address translating node;
transmitting a fourth connection request directed to the second external communication terminal, the fourth connection request having the translated second source network identifier that was translated by the first network address translating node;
receiving a confirmation message from the second external communication terminal by the first network address translating node, the confirmation message comprising a network identifier for the second external communication terminal that is valid inside the second external communication network;
providing the second source network identifier of the third connection request and the network identifier of the second external communication terminal to a connection table for inclusion in another connection entry in the connection table; and
establishing a connection between the first communication terminal and the second external communication terminal such that payload is exchangeable between the first communication terminal and the second external communication terminal.

3. The method of claim 1 wherein the source network identifier of the first connection request is an IP network address, a port number, or a combination of an IP network address and a port number and the network identifier of the first external communication terminal is an IP network address, a port number, or a combination of an IP network address and a port number.

4. The method of claim 1 further comprising providing a second network address translating node having a network connection to the first communication terminal.

5. The method of claim 4 further comprising selecting a network connection of one of the first network address translating node and the second network address translating node to route a transmission based on a desired feature of the network connection, wherein the desired feature of the network connection is least cost routing, call admission control, or selection of a call direction by way of a characteristic number.

6. The method of claim 1 further comprising executing the method with a protocol, wherein the protocol is Internet Connectivity Establishment, Traversal Using Relay Network Address Translators, or Simple Traversal of User Datagram Protocol over Network Address Translators (STUN).

7. The method of claim 1 wherein the first communication terminal is a VoIP communication terminal.

8. The method of claim 1 wherein the payload is communication data and wherein the method further comprises transmitting communication data back and forth between the first communication terminal and the first external communication terminal.

9. The method of claim 1 wherein a STUN server is used in generating the source network identifier.

10. The method of claim 1 wherein the connection entry further comprises an identification of the first external communication terminal by a call number of the first external communication terminal.

11. A communication system comprising:
a communication facility generating a first connection request directed to a first external communication terminal that is external to a first communication network of the communication facility, the first connection request having a source network identifier for a first communication terminal that is valid inside the first communication network; and
a first network address translating node translating the source network identifier of the first connection request to identify a network identifier for the first network address translating node and subsequently transmitting a second connection request directed to the first external communication terminal, the second connection request having the translated source network identifier that was translated by the first network address translating node; and wherein the first network address translating node is configured to receive a confirmation message from the first external communication terminal, the confirmation message comprising a network identifier for the first external communication terminal that is valid inside an external communication network of the first external communication terminal, the external communication network being external from the first communication network; and wherein the first network address translating node provides the source network identifier of the first connection request and the network identifier for the first external communication terminal to a connection table for a connection entry in the connection table; and wherein a connection between the first communication terminal and the first external communication terminal is established such that payload is exchangeable between the first communication terminal and the first external communication terminal.

12. The communication system of claim 11 wherein the connection entry further comprises an identification of the first external communication terminal by a call number of the first external communication terminal.

13. The communication system of claim 11 wherein the source network identifier of the first connection request is an IP network address, a port number, or a combination of an IP network address and a port number, and the network identifier of the first external communication terminal is an IP network address, a port number, or a combination of an IP network address and a port number.

14. The communication system of claim 11 wherein the communication system uses a protocol, wherein the protocol is Internet Connectivity Establishment, Traversal Using Relay Network Address Translators, or Simple Traversal of User Datagram Protocol over Network Address Translators (STUN).

15. The communication system of claim 11 wherein the first communication terminal is a VoIP communication terminal.

16. The communication system of claim 11 wherein the communication facility communicates with a STUN server to obtain the source network identifier of the first connection request.

17. A communication system, comprising:

a plurality of inter-connected first communication terminals inside a first communication network, each of the communication terminals comprising:

a communication facility, the communication facility generating a first connection request directed to a first external communication terminal that is external to a first communication network of the communication facility, the first connection request having a source network identifier for the first communication terminal that is valid inside the first communication network; and a first network address translating node translating the source network identifier of the first connection request to identify a network identifier for the first network address translating node and subsequently transmitting a second connection request directed to the first external communication terminal, the second connection request having the translated source network identifier that was translated by the first network address translating node; and wherein the first network address translating node is configured to receive a confirmation message from the first external communication terminal, the confirmation message comprising a network identifier for the first external communication terminal that is valid inside an external communication network of the first external communication terminal, the external communication network being external from the first communication network; and wherein the source network identifier of the first connection request and the network identifier for the first external communication terminal is provided to a connection table for a connection entry in the connection table; and wherein a connection between the first communication terminal and the first external communication terminal is established such that payload is exchangeable between the first communication terminal and the first external communication terminal.

* * * * *